(12) United States Patent
Howell

(10) Patent No.: US 12,503,221 B2
(45) Date of Patent: Dec. 23, 2025

(54) CONTROLLER FOR AN AIRCRAFT SYSTEM

(71) Applicant: AIRBUS OPERATIONS LIMITED, Bristol (GB)

(72) Inventor: George Howell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 434 days.

(21) Appl. No.: 17/679,685

(22) Filed: Feb. 24, 2022

(65) Prior Publication Data
US 2022/0274691 A1 Sep. 1, 2022

(30) Foreign Application Priority Data

Feb. 26, 2021 (GB) .................................... 2102798

(51) Int. Cl.
*B64C 25/44* (2006.01)
*B60T 8/92* (2006.01)
*B60T 17/22* (2006.01)

(52) U.S. Cl.
CPC ................ *B64C 25/44* (2013.01); *B60T 8/92* (2013.01); *B60T 17/22* (2013.01); *B60T 2240/02* (2013.01); *B60T 2270/402* (2013.01); *B60T 2270/414* (2013.01)

(58) Field of Classification Search
CPC . B64C 25/44; B60T 8/92; B60T 17/22; B60T 2240/02; B60T 2270/402; B60T 2270/414
See application file for complete search history.

(56) References Cited

U.S. PATENT DOCUMENTS

| 4,792,192 A | 12/1988 | Tveitane | |
|---|---|---|---|
| 5,397,173 A | 3/1995 | Bourguet | |
| 2010/0243388 A1* | 9/2010 | Holzwarth | B60T 8/885 188/158 |
| 2011/0100770 A1* | 5/2011 | Frank | B60T 13/741 188/106 R |
| 2012/0065816 A1* | 3/2012 | Cahill | B60T 8/17 188/106 P |

(Continued)

FOREIGN PATENT DOCUMENTS

| EP | 2 974 924 | 1/2016 |
|---|---|---|
| WO | 00/69721 | 11/2000 |

*Primary Examiner* — Abby J Flynn
*Assistant Examiner* — Clint Pham
(74) *Attorney, Agent, or Firm* — Nixon & Vanderhye, P.C.

(57) ABSTRACT

A controller for an aircraft system of an aircraft, the aircraft system including a first actuator and a first energy supply. The controller is configured to, when the aircraft system is configured in a first configuration, in which the first actuator is coupled to the first energy supply, determine that there is a loss of energy supplied to the first actuator from the first energy supply. The controller is configured to determine a change in performance achievable by reconfiguring the aircraft system from the first configuration to an alternative configuration, in which the first actuator is uncoupled from the first energy supply, and cause reconfiguration of the aircraft system from the first configuration to the alternative configuration, in the event that the change in performance determined by the controller is a gain in performance.

20 Claims, 3 Drawing Sheets

(56) References Cited

U.S. PATENT DOCUMENTS

| | | | |
|---|---|---|---|
| 2013/0006447 A1* | 1/2013 | Thibault | B60T 8/1703 |
| | | | 701/3 |
| 2018/0099650 A1* | 4/2018 | Jones | B60T 7/042 |
| 2019/0001949 A1* | 1/2019 | Ying | B60T 8/4081 |
| 2019/0299944 A1* | 10/2019 | Nilsson | B60T 7/042 |
| 2020/0055612 A1* | 2/2020 | Delame | B64D 47/00 |
| 2020/0407049 A1 | 12/2020 | Forghani et al. | |

* cited by examiner

CONTROLLER FOR AN AIRCRAFT SYSTEM

RELATED APPLICATION

This application incorporates by reference and claims priority to United Kingdom patent application GB 2102798.2, filed Feb. 26, 2021.

TECHNICAL FIELD

The present invention relates to controllers for aircraft systems, and specifically to controllers for aircraft braking systems.

BACKGROUND

Aircraft systems, such as aircraft braking systems, may use primary energy supplies to supply electric or hydraulic energy to one or more actuators, such as brake actuators, to operate the actuators. The energy supplies may be hydraulic pumps or batteries, for example. Such aircraft systems may also employ redundant or backup systems, such as comprising hydraulic accumulators or batteries, to supply energy to actuators in the event of a loss of energy supplied from the primary energy supplies. Switching to a backup system may result in a reduction in performance of the aircraft system, while switching to a redundant system may result in no reduction in performance.

Aircraft braking systems apply braking forces to respective wheels of an aircraft to develop respective reactive forces between the wheels and the ground, such as a runway or taxiway. The reactive forces slow the aircraft, such as during a landing or taxiing manoeuvre. The reactive forces are limited by a level of friction between the wheels and the ground. If, during a braking event, the reactive force for a given wheel exceeds a maximum reactive force, the wheel may lock and "slip" over the surface of the ground, such as over the runway surface, causing a reduction in the total effective braking force provided by the aircraft braking system. Aircraft may employ anti-lock braking systems to control the braking force applied to the wheels to help reduce or prevent wheel slip.

SUMMARY

A first aspect of the present invention provides a controller for an aircraft system of an aircraft, the aircraft system comprising a first actuator and a first energy supply, the controller configured to: when the aircraft system is configured in a first configuration, in which the first actuator is coupled to the first energy supply, determine that there is a loss of energy supplied to the first actuator from the first energy supply; determine a change in performance achievable by reconfiguring the aircraft system from the first configuration to an alternative configuration, in which the first actuator is uncoupled from the first energy supply; and cause reconfiguration of the aircraft system from the first configuration to the alternative configuration, in the event that the change in performance determined by the controller is a gain in performance.

Accordingly, the controller is configured to determine the change in performance on the basis of a comparison between a current performance achievable when the aircraft system is configured in the first configuration and a predicted performance achievable by reconfiguring the aircraft system from the first configuration to the alternative configuration. In this way, the controller may provide intelligent control and reconfiguration of an aircraft system in the event of a loss of energy supplied to the first actuator in the first configuration. This may provide more versatile control, improved performance and improved safety the aircraft system. The controller may be configured to make the comparison. That is, the controller may be configured to: determine the current performance achievable when the aircraft system is configured in the first configuration, determine the predicted performance achievable by reconfiguring the aircraft system from the first configuration to the alternative configuration, perform the comparison between the current performance and the predicted performance, and determine the change in performance on the basis of the comparison between the current performance and the predicted performance.

Optionally, the aircraft system is a hydraulic aircraft system. Optionally, the first energy source is a hydraulic pump and/or the first actuator is a hydraulic actuator. Optionally, the aircraft system is an electric system. Optionally, the first energy source is an electric energy source, such as a generator or battery. Optionally, the second actuator is an electric actuator.

Optionally, the aircraft system comprises a second energy supply, and the alternative configuration is either: a first alternative configuration, in which the first actuator is coupled to the second energy supply; or a second alternative configuration, in which the first actuator is isolated from the first energy supply and the second energy supply.

The first energy supply may be primary energy supply of the aircraft system, such as comprising a hydraulic pump. The second energy supply may be a backup or redundant energy supply of the aircraft braking system, such as a hydraulic accumulator or another hydraulic pump. In this way, the controller may determine, in the event of a loss of energy to the first actuator from a primary energy supply, whether to connect the first actuator to a backup or redundant energy supply, or to isolate the first actuator.

Optionally, the second energy supply is sized to provide less than, the same, or more energy, or power, than the first energy supply. That is, the second energy supply may have a lower, the same, or a higher capacity than the first energy supply.

Optionally, the aircraft system comprises a second actuator. Optionally, in the first configuration, the second actuator is coupled to the first energy supply, and, in the alternative configuration, the second actuator is coupled to the first energy supply. Alternatively, in the first configuration, the second actuator is coupled to the first energy supply, and, in the alternative configuration, the second actuator is coupled to the second energy supply.

In this way, the first and second actuators may be coupled to a primary energy supply in the first configuration, and the controller may determine whether to couple one or both of the first and second actuators to a backup or redundant energy supply in the event of a loss of energy to the first actuator in the first configuration.

Optionally, in the first configuration, the second actuator is coupled to the second energy supply, and, in the alternative configuration, the second actuator is coupled to the first energy supply. Alternatively, in the first configuration, the second actuator is coupled to the second energy supply, and, in the alternative configuration, the second actuator is coupled to the second energy supply.

In this way, the first energy supply may be configured to nominally supply energy to a first energy distribution system comprising the first actuator, and the second energy supply may be configured to nominally supply energy to a second energy distribution system comprising the second actuator.

The first and second energy distribution systems may be linked by a crossover valve. The controller may determine, in the event of a loss of energy to the first brake in the first configuration, whether to cause the crossover valve to open to couple the first brake to the second energy distribution system, and thus the second energy supply.

Optionally, the controller is configured to determine the change in performance on the basis of a change in performance associated with the first and second actuators achievable by reconfiguring the aircraft system from the first configuration to the alternative configuration. Improved control of the aircraft system as a whole may be provided by considering a change in performance of more than one actuator.

Optionally, the aircraft system comprises a third energy supply, and the first actuator is coupled to the third energy supply in the second alternative configuration. The third energy supply may be a redundant or backup energy supply of the first energy distribution system, where one is present, for example. In this way, the controller may determine, on the basis of the change in performance, whether to couple the first brake actuator to the second energy distribution system, such as by causing operation of a crossover valve of the sort discussed above, or to couple the first brake actuator to the backup energy supply of the first energy distribution system. This may provide improved control and/or safety of a system comprising more than one energy distribution system for nominally supplying energy from a respective more than one energy supplies to a respective more than one actuator or set of actuators.

Optionally, the aircraft system is an aircraft braking system. In this way, the controller may provide improved control of braking provided by the aircraft braking system.

Optionally, the first actuator is a first brake actuator configured to brake a first wheel of the aircraft. Optionally, the controller is configured to determine a first parameter representative of a maximum reactive force able to be achieved between the first wheel and the ground. Optionally, the ground is a runway surface, or a taxiway. Optionally, the controller is configured to determine the change in performance on the basis of the first parameter.

The first parameter may be, or may be representative of, an energy or power able to be supplied to the first brake actuator before causing a wheel slip of the first wheel. That is, the controller may provide improved braking by considering a possibility for wheel slip prior to reconfiguring the aircraft braking system.

Optionally, the controller is configured to determine a first braking parameter representative of a maximum braking force able to be applied by the first brake actuator in the alternative configuration. Optionally, the controller is configured to determine the change in performance on the basis of the first braking parameter. The first braking parameter may be, or may be representative of, a maximum energy or power able to be supplied to the first brake actuator in a given configuration. That is, the controller may provide improved braking by considering a maximum amount of energy able to be supplied to, and thus a maximum amount of force able to be applied by, the first brake actuator.

Optionally, the second actuator is a second brake actuator configured to brake a second wheel of the aircraft. Optionally, the controller is configured to determine a second parameter representative of a maximum reactive force able to be achieved between the second wheel and the ground. The second parameter may be, or may be representative of, an energy or power able to be supplied to the second brake actuator before causing a wheel slip of the second wheel.

Optionally, the controller is configured to determine a second braking parameter representative of a maximum braking force able to be applied by the second brake actuator in the alternative configuration. The second braking parameter may be, or may be representative of, a maximum energy or power able to be supplied to the second brake actuator in a given configuration.

Optionally, the controller is configured to determine the change in performance on the basis of the first and second parameters and the first and second braking parameters.

Optionally, the controller is configured to determine the first parameter and/or the second parameter on the basis of one or a combination of: a measured performance of the respective first and second brake actuators; an environmental condition; and a status of the aircraft.

Optionally, the measured performance of each of the first and second brake actuators comprises one or more of: a measured slip between the respective first and second wheel and the ground; a measured energy supplied to the respective first and second brake actuator; and a measured braking torque, or braking force, applied by the respective first and second brake actuator to the respective first and second wheel.

By using a measured performance of the aircraft, the reactive force of the first and/or second brake actuators, which is represented by the respective first and/or second parameters, may be determined more accurately. Advantageously, this may be by the controller receiving signals relating to wheel slip from another controller or system of the aircraft, such as from an anti-lock braking system of the aircraft.

Optionally, the environmental condition comprises one or both of an atmospheric condition and a ground condition. That is, the controller may consider an effect of the condition of the ground, such as a coefficient of friction of a runway or taxiway, on the reactive force achievable between the first and/or second wheels and the ground. Moreover, the controller may consider atmospheric effects on the reactive force, such as the effect of a crosswind, which may cause the aircraft to roll and increase a downforce on the wheels on one lateral side of the aircraft. This may in turn increase the reactive force achievable by those wheels and associated brake actuators, and decrease a reactive force achievable by other wheels, such as wheels on the other lateral side of the aircraft. In this way, the controller may determine the first and/or second parameters with greater accuracy.

Optionally, the status of the aircraft comprises any one or a combination of: a position of the aircraft; a motion of the aircraft; an orientation of the aircraft; and a configuration of the aircraft. The controller may take into account the position, or location, of the aircraft, using a GPS system for example. The controller may also take into account an orientation of the aircraft, such as a level of pitch, roll and/or yaw of the aircraft. For example, if the aircraft is pitched forward, such as by applying brakes of the aircraft, a greater downforce may be applied to wheels on a front side of a landing gear of the aircraft, thereby increasing the reactive force achievable by those wheels and associated brake actuators. In that example, a lower downforce may be applied to wheels on a rear side of the landing gear, decreasing the reactive force achievable by those wheels and associated brake actuators.

The motion of the aircraft, such as direction of travel and/or the trim of the aircraft, may be used by the controller to determine a desired distribution of braking on either lateral side of a fuselage or landing gear of the aircraft. Moreover, a configuration of the aircraft, such as a configuration of a retardation device, such as an air brake or reverse thruster, may be used by the controller to determine a desired distribution of braking on either lateral side of a fuselage or landing gear of the aircraft. This may allow the controller to reconfigure the aircraft braking system to provide more symmetrical braking, and/or to provide a distribution of braking required to achieve a desired of travel of the aircraft. The controller may consider an increase in reactive force achievable by brake actuators at a front of a landing gear of the aircraft, and/or a reduction in reactive force achievable by brake actuators at a rear of the landing gear, such as when the aircraft is pitched forward by an action of braking, or due to an effect of flaps, rear elevators or any other flight surface configured so as to result in a pitching of the aircraft. In this way, the controller may provide even more intelligent and adaptable control of the aircraft braking system and the reconfiguration thereof.

Optionally, the controller is configured to determine a reconfiguration parameter representative of a loss in performance estimated to be incurred by an action of reconfiguring the aircraft system from the first configuration to the alternative configuration. Optionally, the controller is configured to determine the change in performance on the basis of the reconfiguration parameter.

In this way, the controller may determine whether a loss in braking performance due to reconfiguring the aircraft system is acceptable before reconfiguring the aircraft braking system. This may allow the controller to provide improved performance, such as by selecting one alternative configuration over another, wherein the two configurations provide similar improvements in performance, but wherein reconfiguring the aircraft system to one of the configurations would result in greater reconfiguration losses than reconfiguring to the other configuration.

Optionally, the controller is configured to determine a symmetry parameter representative of a change in a distribution of braking around a plane of symmetry of the aircraft, such as around a fuselage and/or a landing gear of the aircraft. Optionally, the controller is further configured to determine the change in performance on the basis of the determined symmetry parameter. The symmetry parameter may indicate an improvement in the distribution of the braking, such as a change towards a desired distribution of braking.

In this way, the controller may improve a symmetry of braking provided by the aircraft system following reconfiguration, and/or may provide a desired distribution of braking, such as to counter a trim of the aircraft, and/or may provide improved braking by supplying energy to brake actuators associated with wheels encountering a greater downforce due to, for example, a pitch or a roll of the aircraft.

Optionally, the controller is configured to determine a respective change in performance achievable by reconfiguring the aircraft system from the first configuration to each of a plurality of alternative configurations. Optionally, the controller is configured to, in the event that at least one of the changes in performance is a gain in performance, select the alternative configuration to which reconfiguring the aircraft system would result in a gain in performance. Optionally, the controller is configured to select the alternative configuration to which reconfiguring the aircraft braking system would result in the greatest gain in performance Optionally, the controller is configured to cause reconfiguration of the aircraft system from the first configuration to the alternative configuration selected by the controller.

In this way, the controller may provide improved performance and safety by considering and selecting from plural possible alternative configurations.

A second aspect of the present invention provides a method of operating a controller of an aircraft system of an aircraft, the aircraft system comprising a first actuator and a first energy supply, the method comprising: when the aircraft system is configured in a first configuration, in which the first actuator is coupled to the first energy supply, determining that there is a loss of energy supplied to the first actuator from the first energy supply; determining a change in performance achievable by reconfiguring the aircraft system from the first configuration to an alternative configuration, in which the first actuator is uncoupled from the first energy supply; and causing reconfiguration of the aircraft system from the first configuration to the alternative configuration in the event that the change in performance is a gain in performance.

Accordingly, the method comprises determining the change in performance on the basis of a comparison between a current performance achievable when the aircraft system is configured in the first configuration and a predicted performance achievable by reconfiguring the aircraft system from the first configuration to the alternative configuration. The controller may be configured to make the comparison. That is, the method may comprise: determining the current performance achievable when the aircraft system is configured in the first configuration, determining the predicted performance achievable by reconfiguring the aircraft system from the first configuration to the alternative configuration, performing the comparison between the current performance and the predicted performance, and determining the change in performance on the basis of the comparison between the current performance and the predicted performance. Optionally, the aircraft system comprises a second energy supply, and the alternative configuration is either a first alternative configuration, in which the first actuator is coupled to the second energy supply, or a second alternative configuration, in which the first actuator is isolated from the first energy supply and the second energy supply.

Optionally, the aircraft system comprises a second actuator. Optionally, in the first configuration, the second actuator is coupled to the first energy supply, and, in the alternative configuration, the second actuator is coupled to the first energy supply. Alternatively, in the first configuration, the second actuator is coupled to the first energy supply and, in the alternative configuration, the second actuator is coupled to the second energy supply.

Optionally, in the first configuration, the second actuator is coupled to the second energy supply, and, in the alternative configuration, the second actuator is coupled to the first energy supply. Alternatively, in the first configuration, the second actuator is coupled to the second energy supply and, in the alternative configuration, the second actuator is coupled to the second energy supply.

Optionally, the method comprises determining the change in performance on the basis of a change in performance associated with the first and second actuators achievable by reconfiguring the aircraft system from the first configuration to the alternative configuration.

Optionally, the aircraft system comprises a third energy supply, and wherein the first actuator is coupled to the third energy supply in the second alternative configuration.

Optionally, the aircraft system is an aircraft braking system. Optionally, the aircraft system comprises first and second brake actuators configured to brake respective first and second wheels of the aircraft.

Optionally, the method comprises: determining a first parameter representative of a maximum reactive force able to be achieved between the first wheel and the ground. Optionally, the method comprises determining a first braking parameter representative of a maximum braking force able to be applied by the first brake actuator in the alternative configuration. Optionally, the method comprises determining the change in performance on the basis of the first parameter and the first braking parameter.

Optionally, the method comprises: determining a second parameter representative of a maximum reactive force able to be achieved between the second wheel and the ground. Optionally, the method comprises determining a second braking parameter representative of a maximum braking force able to be applied by the second brake actuator in the alternative configuration. Optionally, the method comprises determining the change in performance on the basis of the first parameter, the second parameter, the first braking parameter and the second braking parameter.

Optionally, the method comprises determining the first and/or second parameters on the basis of one or a combination of: a measured performance of the respective first and second brake actuators; an environmental condition; and a status of the aircraft.

Optionally, the measured performance of each of the first and second brake actuators comprises one or more of: a measured slip between the respective first and second wheel and the ground; a measured energy supplied to the respective first and second brake actuator; and a measured braking torque, or braking force, applied by the respective first and second brake actuator to the respective first and second wheel.

Optionally, the environmental condition comprises one or both of an atmospheric condition and a ground condition.

Optionally, the status of the aircraft comprises any one or a combination of: a position of the aircraft; a motion of the aircraft; an orientation of the aircraft; and a configuration of the aircraft.

Optionally, the method comprises determining a reconfiguration parameter representative of a loss in performance estimated to be incurred by an action of reconfiguring the aircraft system from the first configuration to the alternative configuration. Optionally, the method comprises determining the change in performance on the basis of the reconfiguration parameter.

Optionally, the method comprises determining a symmetry parameter representative of a change in a distribution of braking around a plane of symmetry of the aircraft, such as around a fuselage and/or a landing gear of the aircraft. Optionally, the method comprises determining the change in performance on the basis of the determined symmetry parameter. The symmetry parameter may indicate an improvement in the distribution of the braking, such as a change towards a desired distribution of braking.

Optionally, the method comprises determining a respective change in performance achievable by reconfiguring the aircraft system from the first configuration to each of a plurality of alternative configurations. Optionally, the method comprises, in the event that at least one of the changes in performance is a gain in performance, selecting the alternative configuration to which reconfiguring the aircraft system would result in a gain in performance. Optionally, the method comprises selecting the alternative configuration to which reconfiguring the aircraft system would result in the greatest gain in performance. Optionally, the method comprises causing reconfiguration of the aircraft system from the first configuration to the alternative configuration selected by the controller.

A third aspect of the present invention provides a non-transitory computer-readable storage medium storing instructions that, when executed by a processor of a controller of an aircraft braking system, cause the processor to perform the method of the second aspect.

A fourth aspect of the present invention provides a controller for an aircraft braking system of an aircraft, the aircraft braking system comprising a first brake actuator and a first energy supply, the controller configured to: when the aircraft braking system is configured in a first configuration, in which the first brake actuator is coupled to the first energy supply, determine that there is a loss of energy supplied to the first brake actuator from the first energy supply; determine a respective change in performance achievable by reconfiguring the aircraft braking system from the first configuration to each of a plurality of alternative configurations; in the event that at least one of the changes in performance is a gain in performance, select an alternative configuration to which reconfiguring the aircraft system would result in a gain in performance; and cause reconfiguration of the aircraft braking system from the first configuration to the alternative configuration selected by the controller. The controller may be configured to select the alternative configuration to which reconfiguring the aircraft system would result in the greatest gain in performance.

Accordingly, the controller is configured to determine the respective change in performance on the basis of comparisons between a current performance achievable when the aircraft system is configured in the first configuration and respective predicted performances achievable by reconfiguring the aircraft system from the first configuration to each of the plurality of alternative configurations. The optional features and advantages of the first aspect of the invention similarly apply to the fourth aspect of the invention. The controller may be configured to make the comparisons. That is, the controller may be configured to: determine a current performance achievable when the aircraft system is configured in the first configuration, determine the respective predicted performances achievable by reconfiguring the aircraft system from the first configuration to each of the plurality of alternative configurations, perform comparisons between the current performance and the respective predicted performances, and determine the respective change in performance on the basis of the comparisons between the current performance and the respective predicted performances.

A fifth aspect of the invention provides an aircraft system comprising the controller of the first aspect or fourth aspect of the invention, or the non-transitory computer-readable storage medium of the third aspect of the invention.

A sixth aspect of the invention provides an aircraft comprising the controller of any one of the first aspect or fourth aspect of the invention, the non-transitory computer-readable storage medium of the third aspect of the invention, or the aircraft system of the fifth aspect of the invention.

BRIEF DESCRIPTION OF THE DRAWINGS

Embodiments of the invention will now be described, by way of example only, with reference to the accompanying drawings, in which.

DETAILED DESCRIPTION

It will be understood that the terms "energy" and "flow" may herein refer to, for example, "hydraulic" energy, such as in the form of pressurised hydraulic fluid, or "electric" energy, such as in the form of an electric current, flowing through a system. Similarly, the term "coupled" herein refers to a coupling of elements to permit a flow of energy from one element to another, such as in the form of pressurised hydraulic fluid or electrical energy, depending on the context in which the term is used.

Figure 1:
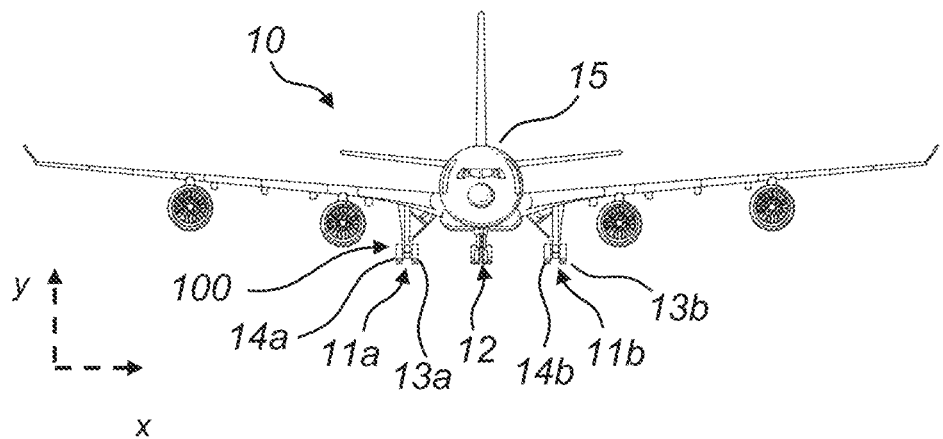
FIG. 1 shows a schematic view of an aircraft according to an example of the present invention.

FIG. 1 shows an example aircraft 10 comprising first and second main landing gears 11a, 11b and a nose landing gear 12. The first and second main landing gears 11a, 11b of the aircraft 10 comprise respective first and second sets of wheels 13a, 13b and respective first and second sets of brakes 14a, 14b for braking the respective first and second sets of wheels 13a, 13b. In the illustrated example, each set of wheels 13a, 13b comprises two wheels and each set of brakes 14a, 14b comprises a respective two brakes. In some examples, each set of wheels 13a, 13b and respective sets of brakes 14a, 14b comprises any number of wheels and respective brakes, such as one, four, up to six, up to ten, or up to twenty wheels and respective brakes. In the illustrated example, each brake in the first and second sets of brakes 14a, 14b comprises a brake actuator (described later) for braking a respective wheel in the first and second sets of wheels 13a, 13b. It will be understood that, in some examples, each set of brakes 14a, 14b may comprise any number of brakes and brake actuators 114a-d for braking any number of respective wheels 113a-d.

Each brake in each of the first and second sets of brakes 14a, 14b is configured to brake a respective wheel in the respective first and second sets of wheels 13a, 13b during a landing or taxiing manoeuvre, such as to slow or stop the aircraft 10, or during flight of the aircraft 10, such as during a pre-landing braking system test or shortly after take-off during retraction braking. The brakes 14 are disc brakes comprising a disc and a calliper (not shown) for exerting a friction force on the disc when the calliper is forced against the disc, such as by a brake actuator. Other types of brake may be used in other examples. As such, the term "braking", particularly when applied to a wheel, herein refers to applying a braking force, or braking torque, to the wheel, such as by brake actuator pressing a calliper against a disc, or any other suitable mechanism for slowing the wheel.

In the present example, the brakes in each set of brakes 14a, 14b are multiple-disc brakes. That is, each brake in the first and second sets of brakes 14a, 14b comprises multiple calipers and multiple discs. In some examples, each brake in the first and second sets of brakes 14a, 14b is a carbon disc brake or a steel brake. In some examples, each brake in the first and second sets of brakes is any other suitable disc brake known in the art, such as a single-disc brake, a ceramic brake, or any other suitable type of aircraft wheel brake.

The nose landing gear 12 does not comprise any brake, though in some examples, one or more wheels of the nose landing gear 12 are braked by respective brakes (not shown).

The aircraft 10 comprises a fuselage 15, and the first and second main landing gears 11a, 11b are located on opposite lateral sides of the fuselage 15. In other examples, the aircraft comprises more than two main landing gears 11a, 11b, and the first and second main landing gears 11a, 11b are two main landing gears located on the same lateral side of the fuselage 15. In some examples, the aircraft 10 comprises one or more central landing gears (not shown), which are located on a centre line of the aircraft, such as aligned with the fuselage 15. In some examples, the central landing gear comprises wheels located on either side of the centre line. Braking the wheels of the central landing gear, either simultaneously or in a staggered fashion, may have no, or a minimal, lateral braking effect.

Figure 2:
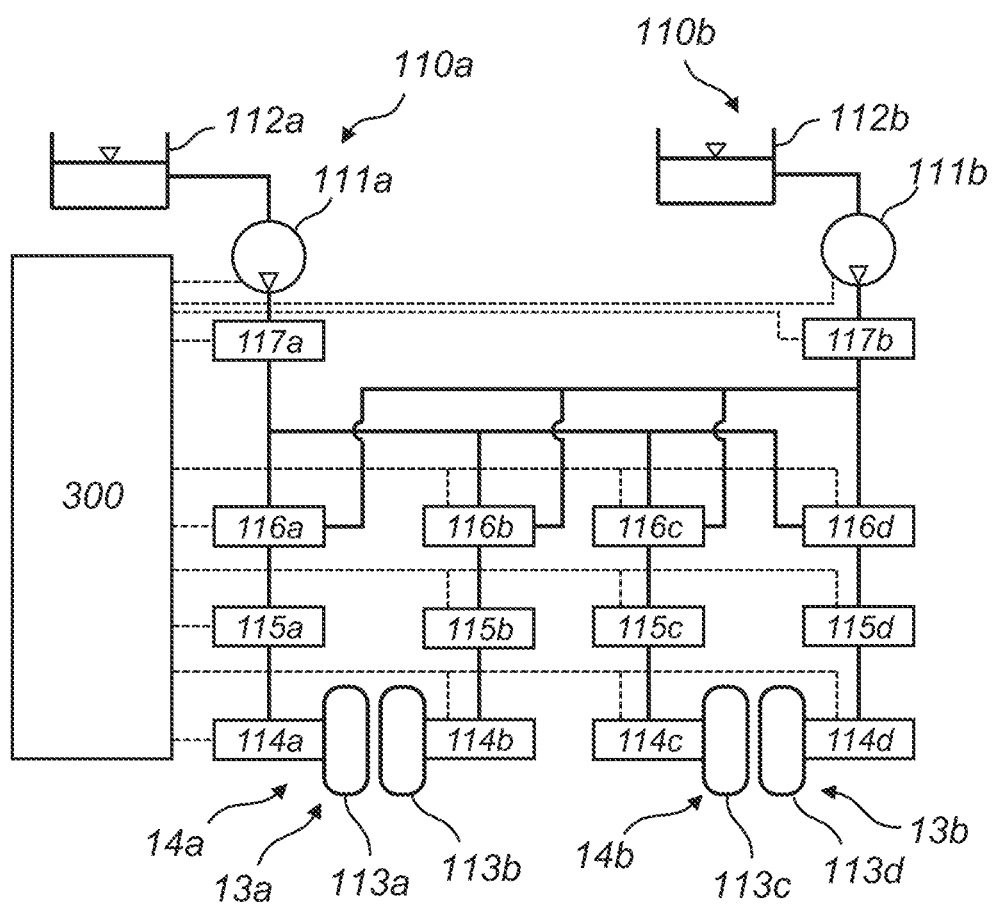
FIG. 2 shows a schematic view of an aircraft system and controller according to an example of the present invention.

The aircraft 10 comprises an aircraft braking system 100, as best shown schematically in FIG. 2. The aircraft braking system 100 described herein is a hydraulic braking system, though the aircraft braking system 100 may, in some examples, be an electric braking system as described below. The aircraft braking system 100 comprises an aircraft braking system controller 300 for controlling the aircraft braking system 100. In some examples, the aircraft braking system controller 300 is separate from the aircraft braking system 100. The aircraft braking system controller 300 will be described in further detail hereinafter.

In the present example, the first set of wheels 13a comprises a first wheel 113a and a second wheel 113b, and the second set of wheels 13b comprises a third wheel 113c and a fourth wheel 113d. The first set of brakes 14a comprises a first brake actuator 114a and a second brake actuator 114b for braking the respective first and second wheels 113a-b, and the second set of brakes 14b comprises a third brake actuator 114c and a fourth brake actuator 114d for braking the respective third and fourth wheels 113c-d. It will be understood that, in some examples, each wheel 113a-d can be braked by more than one brake actuator, or a single brake actuator may brake more than one wheel 113a-d. The brake actuators 114a-d are a part of the aircraft braking system, though in other examples, the first and second sets of brake actuators 114a, 114b are a part of the aircraft 10 and not the aircraft braking system 100. That is, in some examples, the aircraft braking system 100 is connectable to the first and second sets of brake actuators 114a, 114b and is configured to deliver pressurised hydraulic fluid to the first and second sets of brake actuators 114a, 114b in use.

In the illustrated example, the third and fourth brake actuators 114c-d are comprised in the second set of brakes 14b of the second main landing gear 11b. As such, the third and fourth brake actuators 114c-d are located on an opposite lateral side of the fuselage 15 of the aircraft 10 to the first and second brake actuators 114a-b, which are comprised in the first set of brakes 14a of the first main landing gear 11a. In other examples, as noted above, the second main landing gear 11b is on the same lateral side of the fuselage 15 as the first main landing gear 11a. In other examples, the third and fourth brake actuators 114c-d are located on the first main landing gear 14a. In some examples, the third and fourth brake actuators 114c-d are comprised in the first set of brakes 14a. The first and second brake actuators 114a-b and respective first and second wheels 113a-b are located adjacent to each other, though in other examples they are separated from each other by one or more other wheels on the first main landing gear 11a. In the present example, the first and second brake actuators 114a-b and respective first and second wheels 114a-b are located side-by-side on the first main landing gear 11a, perpendicular to a direction of travel of the aircraft 10, though in other examples they are located fore and aft of each another in the direction of travel of the aircraft 10. The same comments apply, mutatis mutandis, to the relative locations of the third and fourth brakes 114c-d and respective third and fourth wheels 114c-d on the second main landing gear 11b.

The aircraft braking system 100 comprises a first energy supply 110a and a second energy supply 110b. In the illustrated example, the aircraft braking system is a hydraulic braking system, and the first and second energy supplies 110a-b are hydraulic energy supplies 110a-b. The first and second energy supplies 110a-b comprise respective first and second hydraulic reservoirs 112a-b and respective first and second pumps 111a-b configured to pump hydraulic fluid from the respective first and second hydraulic reservoirs 111a-b to other components of the aircraft braking system 100, such as to the brake actuators 114a-d as will be described hereinafter. Specifically, the first and second reservoirs 112a-b are configured to store hydraulic fluid, and the first and second hydraulic pumps 111a-b are configured to draw hydraulic fluid from the respective first and second reservoirs 112a-b and to pressurise the hydraulic fluid for distribution through the aircraft braking system 100. Though not shown in FIG. 2, the aircraft braking system is a closed system, for example so that hydraulic fluid can bypass the respective first and second hydraulic pumps 111a-b to be delivered back to the respective first and second reservoirs 112a-b, such as following a braking event, or in the event of an overpressure in the aircraft braking system 100.

Although not shown in FIG. 2 for brevity, the first and second energy supplies 110a-b comprise respective first and second hydraulic buffers, respective first and second relief valves, and respective first and second filters, though in some examples these components may be separate from the respective first and second energy supplies 110a-b, or may not be present in the aircraft braking system 100. The first and second hydraulic buffers are hydraulic accumulators located downstream of the respective first and second hydraulic pumps 111a-b for managing peaks in power demand from the respective first and second hydraulic pumps 111a-b. The first and second relief valves are similarly located downstream of the respective first and second hydraulic pumps 111a-b and are for preventing overpressures in the aircraft braking system 100. The first and second filters are located upstream of the respective first and second hydraulic pumps 111a-b, and are for preventing, or limiting, contamination of the respective first and second hydraulic pumps 111a-b and/or other components of the aircraft braking system 100 with any contaminants which may be present in the hydraulic fluid of the aircraft braking system 100. There may be any number of filters and/or relief valves within the aircraft braking system 100.

As shown in FIG. 2, the first energy supply 110a comprises a first pump control valve 117a and the second energy supply 110b comprises a second pump control valve 117b. In some examples, the first and second pump control valves 117a-b are comprised in the aircraft braking system 100 but are separate to the respective first and second energy supplies 110a-b. The first and second pump control valves 116a-b are configured to control an amount of hydraulic power, or energy, provided by the respective first and second hydraulic pumps 111a-b to components of the aircraft braking system 100. That is, the first and second pump control valves 117a-b can meter an output of the hydraulic pumps 111a-b. In some examples, the first and second pump control valves 116a-b are, or comprise, pump selector valves 117a-b configured to selectively couple the respective first and second hydraulic pumps 111a-b to the downstream components of the aircraft braking system 100. In other examples, the pump control valves 117a-b are not present.

The first and second hydraulic pumps 111a-b are powered by respective first and second power supplies (not shown) of the aircraft 10. The first and second power supplies supply power from respective local power sources, such as power generators, aboard the aircraft 10. In other examples, the first and second power supplies supply power from the same power source, which may be a centralised power source or power generator of the aircraft 10. In some examples, the first and second hydraulic pumps 111a-b can be powered by respective first and second backup power supplies (not shown). The backup power supplies are, for example, backup batteries, or any other suitable energy storage device or power generating device. In some examples, only one of the first and second hydraulic pumps 111a-b can be powered by a backup power supply.

In the present example, the first energy supply 110a has a higher maximum power output than the second energy supply 110b. In other words, the first hydraulic pump 111a has a higher output capacity, or rating, than the second hydraulic pump 111b. That is, the first hydraulic pump 111a is sized to supply more energy per unit of time, i.e. more hydraulic power, than the second hydraulic pump 111b. The first and second hydraulic reservoirs 112a-b are correspondingly sized. In this way, operating each of the first to fourth brakes 114a-b using the second energy supply 110b would result in a reduction in performance of the aircraft braking system 100. In this way, the second energy supply may be a "backup" energy supply for supplying energy to the first to fourth brake actuators 114a-d in the event of a loss of energy to the first to fourth brake actuators 114a-d from the first energy supply 110a. In some such examples, the first energy supply is configured to supply 100% or more of the energy, or power, required to fully operate each of the first to fourth brakes 114a-b, and the second, or backup, energy supply 110b is configured to supply less than 100%, such as up to 50%, up to 60%, up to 80%, or up to 90%, of the energy, or power, able to be supplied by the first energy supply 110a. In some examples, particularly where the second energy supply 110b is a "backup" energy supply, the second energy supply 110b comprises a hydraulic accumulator (not shown), or other suitable energy storage device, instead of a hydraulic pump 111b. The hydraulic accumulator may be charged by the first energy supply 110a or by another energy supply of the aircraft 10. In some examples, the power available from a backup energy supply decays over time as the backup energy supply is discharged. This may be the case, for example, where the aircraft system is an electric braking system and the second energy supply is a battery.

In other examples, the second energy supply 111b has the same capacity as the first energy supply 111a. In some such examples, the second energy supply 110b is a "redundant" energy supply 110b, for supplying energy to the first to fourth brake actuators 114a-d in the event of a loss of energy to the first to fourth brake actuators 114a-d from the first energy supply 110a. In this way, the aircraft braking system 100 can operate at the same performance whether the first to fourth brakes 114a-d are coupled to either the first or the second energy supplies 110a-b.

The aircraft braking system 100 comprises first to fourth brake selector valves 116a-d and first to fourth brake control valves 115a-d associated with respective first to fourth brake actuators 114a-d. The first to fourth brake selector valves 116*a-d* are configured to selectively couple the respective first to fourth brake actuators 114*a-d*, individually, to either the first energy supply 110*a* or the second energy supply 110*b*. The first to fourth brake control valves 115*a-d* are configured to control, meter or regulate an amount of power or energy, such as an amount of pressurised hydraulic fluid, supplied to the respective first to fourth brake actuators 114*a-b* from either the first energy supply 110*a* or the second energy supply 110*b*. In some examples, the first to fourth brake control valves 115*a-d* are servo valves.

In some examples, the first to fourth brake control valves 115*a-d* are not present, or are located upstream of the respective first to fourth brake selector valves 116*a-d*. That is, the brake control valves 115*a-d* and associated brake selector valves 116*a-d* may be arranged in any order. For example, each of the hydraulic connections shown in FIG. 2 connecting the respective first to fourth brake selector valves 116*a-d* to the first and second energy supplies 110*a-b* may comprise a respective brake control valve. In other words, in some examples, each brake selector valve 116*a-d* comprises a respective pair of brake control valves (not shown) for controlling an amount of energy, or power, supplied to the respective selector valve 116*a-d* from the first and second energy supplies 117*a-b*.

In other examples, the aircraft braking system may comprise any other suitable arrangement of valves and connections for selectively coupling each of the first to fourth brake actuators 114*a-d*, individually, to either the first energy supply 110*a* or the second energy supply 110*b*, and optionally for controlling an amount of energy, or power, delivered to the first to fourth brake actuators 114*a-d* for braking the respective first to fourth wheels 113*a-d*.

Figure 3:
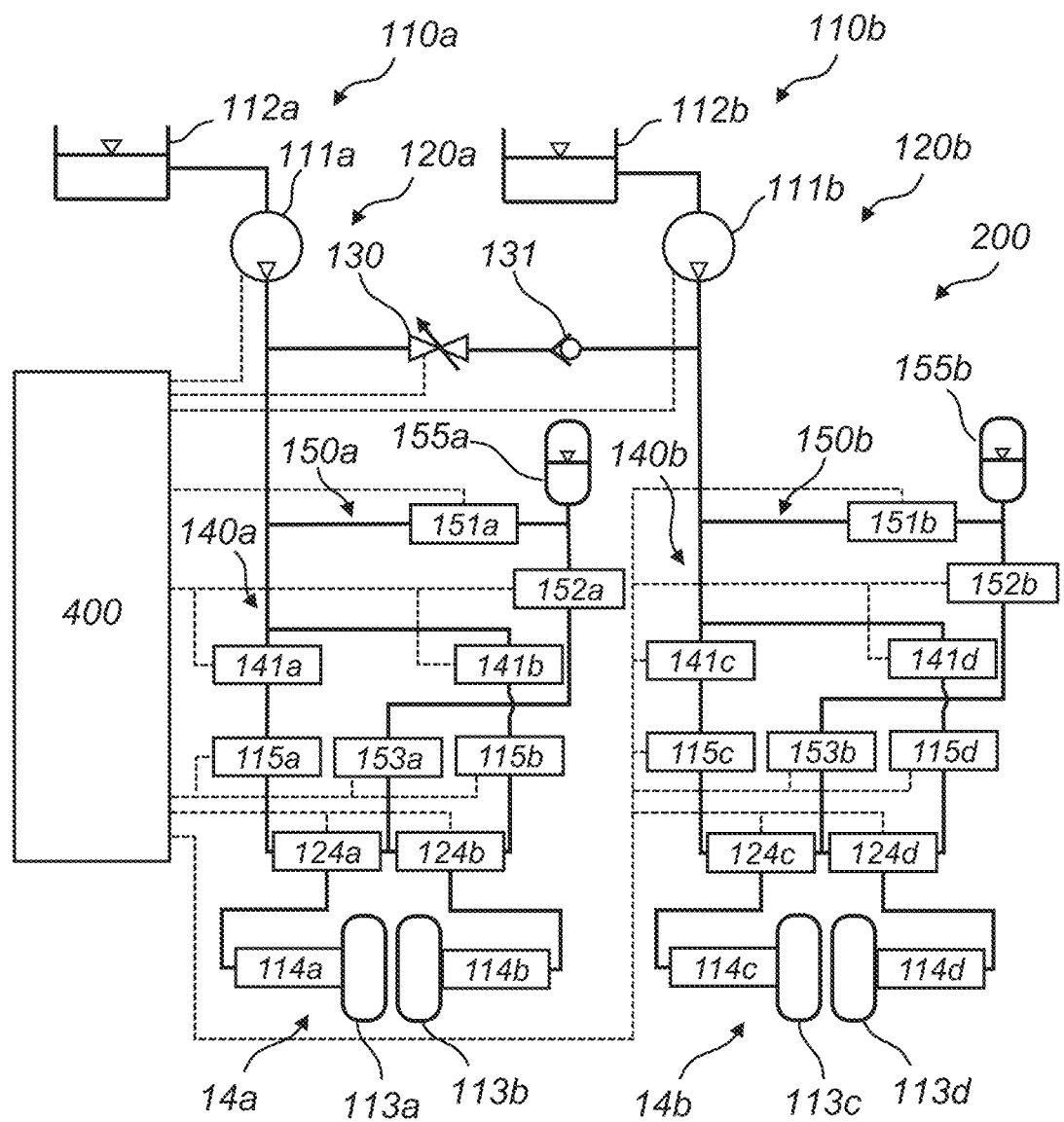
FIG. 3 shows a schematic view of an alternative aircraft system and controller according to an example of the present invention.

One such example of an alternative arrangement of valves and other components of the aircraft braking system 100 is the aircraft braking system 200 shown in FIG. 3, wherein like components are labelled with like reference numerals. Specifically, the aircraft braking system 200 of FIG. 3 comprises the first to fourth wheels 113*a-d*, the respective first to fourth brake actuators 114*a-d* and the first and second energy supplies 110*a-b* which are present in the aircraft braking system 100 of FIG. 2. In this example, the aircraft braking system 200 also comprises first and second hydraulic distribution systems 120*a-b* coupled to the respective first and second hydraulic pumps 111*a-b*. Specifically, in a normal configuration of the aircraft braking system 100, the first and second hydraulic pumps 111*a-b* are configured to supply pressurised hydraulic fluid to the respective first and second sets of brakes 14*a*, 14*b* via the respective first and second hydraulic distribution systems 120*a-b*.

The aircraft braking system 200 comprises a crossover valve 130 connecting the first hydraulic distribution system 120*a* to the second hydraulic distribution system 120*b*. A check valve 131 is provided in-line with the crossover valve 130 to permit hydraulic fluid to flow from the first energy supply 110*a* to the second energy distribution system 120*b* and to hinder or prevent hydraulic fluid flowing from the second energy supply 110*b* to the first energy distribution system 120*a*. Specifically, the crossover valve 130 is operable to selectively configure the crossover valve 130 in either a closed position, to fluidically isolate the first and second hydraulic distribution systems 120*a-b* from each other, or an open position, to fluidically couple the first hydraulic distribution system 120*a* to the second hydraulic distribution system 120*b*.

That is, the aircraft braking system 200 is switchable between: a primary configuration, wherein the crossover valve 130 is in the closed position so that the first hydraulic distribution system 120*a* is fluidically isolated from the third and fourth brake actuators 114*c-d* and the second hydraulic distribution system 120 is fluidically isolated from the first and second brake actuators 114*a-b*; and a secondary configuration, in which the first hydraulic distribution system 120*a* is fluidically coupled to each of the first to fourth brake actuators 114*a-b*. In other words, when the aircraft braking system 200 is configured in the primary configuration, the first and second hydraulic pumps 111*a-b* are configured to deliver energy in the form of pressurised hydraulic fluid to the brake actuators in the respective first and second sets of brakes 14*a*, 14*b*, and in the second configuration, the first hydraulic pump 111 is configured to deliver energy in the form of pressurised hydraulic fluid to the brake actuators in both first and second sets of brakes 14*a*, 14*b*.

In the example shown in FIG. 3, the first energy supply 110*a* has a higher capacity than the second energy supply 110*b*. Specifically, the first energy supply is sized to provide up to 100% of the energy required to operate each of the first to fourth brake actuators 114*a-d*, such as in the event of a loss of energy to the third and/or fourth brake actuator 114*c-d* from the second energy supply. It will be understood that this may be achieved in the present example by opening the crossover valve 130. A similar effect may be achieved in the arrangement shown in FIG. 2 by isolating the second energy supply 110*b* from the third to fourth brakes 114*a-d* and coupling the first energy supply to the third and fourth brakes 114*a-d*.

The first and second hydraulic distribution systems 110*a-b* comprise respective first and second hydraulic accumulators 155*a-b*, which may be more generally referred to herein as "energy storage devices", configured to store energy in the form of pressurised hydraulic fluid for supplying to the respective first and second sets of brakes 14*a*, 14*b*. The first and second hydraulic accumulators 155*a-b* are configured to receive and store energy from the respective first and second energy supplies 110*a-b*. The first and second hydraulic accumulators 155*a-b* can be selectively coupled to the respective first and second energy supplies via respective first and second refill valves 151*a-b*, or, more generally, "charging devices".

The first hydraulic distribution system 120*a* comprises a first normal circuit 140*a* and a first alternative circuit 150*a*, and the second hydraulic distribution system 120*b* comprises a second normal circuit 140*b* and a second alternative circuit 150*b*. The first and second normal circuits 140*a-b* are configured to couple the respective first and second energy supplies 110*a-b* to the respective first and second sets of brakes 14*a*, 14*b*. The first and second alternative circuits 150*a-b* are configured to couple the respective first and second hydraulic accumulators 155*a-b* to the respective first and second sets of brakes 14*a*, 14*b*.

The aircraft braking system 200 comprises first and second shuttle valves 124*a-b* associated with the respective first and second brake actuators 114*a-b*, and third and fourth shuttle valves 124*c-d* associated with the respective third and fourth brake actuators 114*c-d*. The first and second shuttle valves 124*a-b* are operable to selectively couple the respective first and second brake actuators 114*a-b* to either the first normal circuit 140*a* or the first alternative circuit 150*a*. Similarly, the third and fourth shuttle valves 124*a-b* are configured to selectively couple the respective third and fourth brake actuators 114*c-d* to either the second normal circuit 140*b* or the second alternative circuit 150*b*. In this way, the first and/or second alternative circuits 150*a-b* can be coupled to the respective first and/or second sets of brakes 14*a*, 14*b* in the event of a loss of integrity of the respective first and/or second normal circuits 140*a*-*b*, such as in the event of a burst pipe or a faulty component of the respective first and/or second normal circuits 140*a*-*b*. The first to fourth shuttle valves 124*a*-*d* are operable using hydraulic pressure in the respective first and second normal and alternative circuits 140*a*-*b*, 150*a*-*b*. For example, a higher hydraulic pressure in the first normal circuit 140*a* than the first alternative circuit 150*a* causes the first and second shuttle valves 124*a*-*b* to permit a flow of hydraulic fluid from the first normal circuit 140*a* to the respective first and second brake actuators 114*a*-*b*, and to prevent or hinder a flow of hydraulic fluid from the first alternative circuit 150*a* to the respective first and second brake actuators 114*a*-*b*. In some examples, the first to fourth shuttle valves 124*a*-*d* are any other suitable valves, such as selector valves.

As in the aircraft braking system 100 of FIG. 2, the aircraft braking system 200 as shown in FIG. 3 comprises first to fourth brake control valves 115*a*-*d*, which may be servo valves or any other suitable type of valve for controlling a flow of energy to the respective first to fourth brake actuators 114*a*-*d*. The aircraft braking system 200 further comprises first and second primary selector valves 141*a*-*b* for selectively coupling, i.e. selectively permitting or preventing a flow of hydraulic fluid from the first energy supply 110*a* to the respective first and second brakes 114*a*-*b*. In other words, the first and second primary selector valves 141*a*-*b* are operable, such as by a controller 400 of the aircraft braking system 200, as described hereinafter, to "authorise" operation of the respective first and second brakes 114*a*-*b*. In a similar way, the aircraft braking system 200 shown in FIG. 3 comprises third and fourth primary selector valves 141*c*-*d* for selectively coupling the third and fourth brake actuators 114*c*-*d*, respectively, to the second energy supply 110*b*, or, when the crossover valve 130 is open, to the first energy supply 110*a*.

The first alternative circuit 150*a* comprises a first alternative selector valve 152*a* arranged in series with a first alternative control valve 153*a* to connect the first hydraulic pump 111*a* to the first and second brake actuators 114*a*-*b* via the respective first and second shuttle valves 124*a*-*b*. Similarly, the second alternative circuit 150*b* comprises a second alternative selector valve 152*b* arranged in series with a second alternative control valve 153*b* to connect the second hydraulic pump 111*b* to the third and fourth brake actuators 114*c*-*d* via the respective third and fourth shuttle valves 124*c*-*d*. The first and second alternative selector valves 152*a*-*b* are operable in a similar way to the first and second primary selector valves 141*a*-*b* to authorise braking of the respective first and second sets of brakes 14*a*, 14*b* using hydraulic fluid from the respective first and second alternative circuits 150*a*-*b*. Likewise, first and second alternative control valves 153*a*-*b* are operable in similar way to the first to fourth brake control valves 115*a*-*d* to control braking of the respective first and second sets of brakes 14*a*, 14*b* using hydraulic fluid from the respective first and second alternative circuits 150*a*-*b*.

Again, it will be understood that the aircraft braking system 200 may comprise any suitable arrangement of valves and connections for selectively coupling the first to fourth brake actuators 114*a*-*b* to the first and/or second energy supplies 110*a*-*b* and/or the first and/or second hydraulic accumulators 155*a*-*b* in any of the manners described herein.

The aircraft braking system 100 shown in FIG. 2 comprises a controller 300 for controlling the aircraft braking system 100. The aircraft braking system 200 shown in FIG. 3 comprises a similar controller 400. The controller 300 of FIG. 2 is configured to cause operation of the various valves and energy supplies specific to the aircraft braking system 100 of FIG. 2 to achieve the described functionality, while the controller 400 of FIG. 3 is configured to cause operation of the various valves and energy supplies specific to the aircraft braking system 200 of FIG. 3 to achieve the described functionality. Otherwise, except where indicated, the following discussion applies equally to each of the controllers 300, 400 and aircraft braking systems 100, 200 shown in FIGS. 2 and 3. Moreover, it will be understood that each of the controllers 300, 400 can be supplied separately to the respective aircraft braking systems 100, 200, or may be supplied as part of the respective aircraft braking systems 100, 200 and/or the aircraft 10.

The aircraft braking system 100, 200 is configurable in a "first configuration". In one example of the first configuration of the aircraft braking system 100, 200, the first brake actuator 114*a* is coupled to the first energy supply 110*a*, and the second to fourth brake actuators 114*b*-*d* are individually coupled to either the first or the second energy supplies 110*a*-*b*, or are individually uncoupled from both the first and second energy supplies 110*a*-*b*. When the aircraft is in the first configuration of the present example, the controller 300, 400 is configured to determine that there is a loss of energy supplied to the first brake actuator 114*a* from the first energy supply 110*a*, such as due to a failure of a part or component of the aircraft system 100, 200. This is by the controller 300, 400 detecting the loss of integrity, for example using sensors such as pressure sensors, or by the controller 300, 400 receiving a signal indicative of the loss in energy supplied to the first brake actuator 114*a*, for example from any other controller of the aircraft 10.

The controller is further configured to determine a change in performance achievable by reconfiguring the aircraft braking system 100, 200 from the first configuration to an alternative configuration. In one example alternative configuration, the first brake actuator 114*a* is uncoupled from the first energy supply 110*a* and the second energy supply. In the example alternative configuration, the second to fourth brake actuators 114*b*-*d* are individually coupled to either the first or the second energy supplies 110*a*-*b*, or are uncoupled from both the first and second energy supplies 110*a*-*b*. The change in performance may be either a gain in performance or a reduction in performance, as will be described in more detail below. In the event that the change in performance is a gain in performance, the controller 300, 400 is configured to cause reconfiguration of the aircraft from the first configuration to the alternative configuration.

Specifically, the controller 300, 400 is configured to determine a respective change in performance achievable by reconfiguring the aircraft braking system 100, 200 from the first configuration to each of a plurality of alternative configurations, and select the alternative configuration to which reconfiguring the aircraft braking system 100, 200 would result in the greatest gain in performance. In other examples, the controller 300, 400 is configured to select an alternative configuration to which reconfiguring the aircraft braking system 100, 200 would result in a gain in performance that need not be the greatest gain in performance, such as a gain in performance over a predetermined threshold, or any other gain in performance. In some examples, the first configuration is any suitable configuration of the aircraft braking system 100, 200, and the alternative configurations are any other suitable configurations of the aircraft braking system 100, 200.

In the present example, the controller 300, 400 is configured to determine a "current performance" achievable by the aircraft braking system 100, 200 in the first configuration in view of the loss of energy to the first brake actuator 114a, which may be either a reduction in, or a complete loss of energy to the first brake actuator 114a. The controller 300, 400 is then configured to determine a "predicted performance" achievable in one or more possible alternative configurations. The controller 300, 400 is configured to determine the change in performance on the basis of the current performance and the one or more predicted performances. That is, the controller 300, 400 is configured to perform a comparison between the current performance and predicted performance, and to determine the change in performance on the basis of the comparison between the current performance and the predicted performance. The change in performance is either a gain or a reduction in performance.

The change in performance is a change in braking performance, such as a change in a total braking force achievable by one or more of the first to fourth brake actuators 114a-d, or the aircraft braking system 100, 200 as a whole, resulting from a reconfiguration from the first configuration to the alternative configuration. In some examples, the total braking force achievable takes into account a capacity of the one or more brake actuators 114a-d to slow the respective one or more wheels 113a-d in a given configuration, and also a maximum reactive force achievable between the one or more respective wheels 113a-d and the ground, such as a runway or taxiway on which the aircraft 10 is, or will be, rolling during a landing or taxiing manoeuvre.

The capacity of a brake actuator 114a-d is an ability of the brake actuator 114a-d to slow a respective wheel 113a-d. The capacity is, for example, a maximum braking force, or braking torque, able to be provided by the brake actuator 114a-d to slow a respective wheel 113a-d in a given configuration of the aircraft braking system 100, 200. This, in turn, is dependent on the energy, or power, able to be supplied to the brake actuator in the given configuration. In some examples, the capacity is also dependent on a condition of brake components associated with the brake actuator 114a-d, such as a wear of a brake calliper associated with the brake actuator 114a-d.

The reactive force is a force acting between a wheel 113a-d and the ground to slow the aircraft 10, such as when the aircraft 10 is travelling along a runway. The maximum reactive force associated with a given brake actuator 114a-d is a maximum reactive force able to be achieved between a respective wheel 113a-d associated with the brake actuator 114a-d and the ground without the wheel 113a-d "slipping" or "locking", as referred to hereinbefore. This, in turn, is dependent on a friction between the wheel 113a-d and the ground. The friction is dependent a condition of the ground and a condition of a tyre of the wheel 113a-d. For example, compared to dry ground, wet ground, such as a wet runway or taxiway, would result in a lower coefficient of friction between the wheel 113a-d and the ground, and would reduce a reactive force able to be applied before slippage of the wheel 113a-d on the ground occurs.

In other examples, the change in performance is, or takes into account, a change in a symmetry, or distribution, of braking provided by brake actuators 114a-d located on either lateral side of the fuselage 15, such as a change in a level of braking provided by the first and second brake actuators 114a-b relative to a level of braking provided by the third and fourth brake actuators 114c-d. In some examples, the change in symmetry is a change in a level of braking provided by brake actuators 114a-d on the same landing gear 13a, 13b, such as a symmetry in the level of braking provided by the first and second brake actuators 114a-b. A gain in performance may be a change towards a desired level of symmetry of braking. For example, a desired level of symmetry may be equal braking provided by brake actuators 114a-d on either lateral side of the fuselage 15. Alternatively, if a retardation component, such as an air brake or reverse thruster located on one lateral side of the aircraft 10 fuselage 15, were to fail, a desired level of symmetry of braking may comprise an increase in braking provided by brake actuators 114a-b on the other lateral side of the fuselage 15 and/or a reduction in braking provided by brake actuators 114c-d on the same lateral side of the fuselage 15.

In some examples, for a given brake actuator 114a-d, the controller 300, 400 is configured to determine the current and predicted performances of that brake actuator 114a-d on the basis of a "braking parameter" representative of the capacity of that brake actuator 114a-d. In the present example, the braking parameter is representative of an amount of energy, or power, able to be supplied to the brake actuator 114a-d in a given configuration of the aircraft braking system 100, 200.

The controller 200, 300 is further configured, for the given brake actuator 114a-d, to determine the current and predicted performances of that brake actuator 114a-d on the basis of a "reactive parameter" indicative of a maximum achievable reactive force associated with that brake actuator 114a-d. In the present example, the reactive parameter is representative of an amount of energy, or power, able to be supplied to the brake actuator 114a-d before a wheel 113a-d associated with the brake actuator 114a-d locks, or slips.

In some examples, the controller 200, 300 is configured to determine a symmetry parameter representative of a change in the distribution of braking around a plane of symmetry of the aircraft 10, such as around the fuselage 15, and/or around a given landing gear 11a-b, as discussed above. In some examples, the controller 200, 300 is further configured determine the change in performance on the basis of the determined symmetry parameter.

In some examples, the controller 300, 400 is further configured to determine a reconfiguration parameter representative of a loss in performance estimated to be incurred by an action of reconfiguring the aircraft braking system 100, 200 from the first configuration to a respective alternative configuration, and to determine the change in performance on the basis of the reconfiguration parameter. That is, in some examples, the controller 300, 400 takes into an account a loss in performance, such as a temporary reduction in performance, which may result from activating one or more of the valves or other components of the aircraft braking system 100, 200 when reconfiguring the aircraft braking system 100, 200. For example, with reference to FIG. 2, there may be a delay involved in operating the first selector valve 116a to first uncouple the first brake actuator 114a from the first energy supply 111a and then to couple the first brake actuator 114a to the second energy supply 111b. There may be no, or little, energy supplied to the first brake actuator 114a during the delay, resulting in a loss in performance.

In the illustrated examples, the controller 300, 400 is configured to determine the change in performance on the basis of a change in performance associated with one of the first to fourth brake actuators 114a-d and at least one other of the first to fourth brake actuators 114a-d. Taking the aircraft braking system 100 of FIG. 2, for example, the first and second brake actuators 114a-b may be coupled to the first energy supply 111a in the first configuration. In such an example, in the event of a loss of energy supplied to the first brake actuator 114a from the first energy supply 111a, the controller 300 is able to determine a first change in performance achievable by reconfiguring the aircraft braking system 100 to a first alternative configuration in which, for example, the first brake actuator 114a is coupled to the second energy supply 111b, which, as noted above, may be a backup energy supply 111b providing reduced braking performance. The controller 300, 400 also determines a second change in performance achievable by reconfiguring the aircraft braking system 100 to a second alternative configuration, in which, for example, the first brake actuator 114a is isolated from the first and second energy supplies 111a-b, and some or all of the energy supplied to the first brake 114a in the first configuration is instead able to be re-routed to the second brake 114b, and/or to one or both of the third and fourth brakes 114c-d. The controller 300 then determines whether either of the first and second changes in performance is a gain in performance. In these examples, the controller 300 also determines which of the first and second changes in performance provides the greatest gain, but this determination need not be carried out in some other examples.

In one example, such as when the aircraft 10 is travelling on dry ground, the reactive force associated with the first and second brake actuators 114a-b may be relatively high. In which case, it may be possible to increase the level of braking applied by the second brake actuator 114b, and thus the energy supplied to the second brake actuator 114b, without the respective second wheel 113b slipping. If this increase in braking provided by reconfiguring and redistributing energy to the second brake actuator 114b is higher than a level of braking able to be provided by reconfiguring the aircraft system 100 to the first alternative configuration, then the controller 300 will cause reconfiguration of the aircraft system to the second alternative configuration. This may be the case, for example, where the second energy supply 111b has a lower capacity than the first energy supply 111a, and/or where the reconfiguration parameters associated with reconfiguring the aircraft braking system 100 to the first and second alternative configurations indicate greater losses would be incurred by reconfiguring the aircraft braking system 100 to the first alternative configuration than to the second alternative configuration.

In another example, such as when the aircraft 10 is travelling on wet or otherwise slippery ground, the reactive force associated with the each of the first and second brake actuators 114a-b may be lower than the braking able to be achieved by either of the first and second brake actuators 114a-b in the first alternative configuration. That is, the reactive force would be a limiting factor. In which case, the controller 300 may determine, e.g. based on the determined braking parameters, reactive parameters and reconfiguration parameters, that there is no benefit to reconfiguring the aircraft braking system 100 to the second alternative configuration, as it would not be possible to increase the braking applied to the second brake actuator 114b without the respective second wheel 113b slipping. In such an example, the controller 300 would cause reconfiguration of the aircraft braking system to the first alternative configuration (or to any other alternative configuration that is deemed to provide the greatest gain in performance). In some examples, the reactive force is such a limiting factor, and/or the loss by the action of reconfiguring is so great, that the controller 300 determines there is no benefit to reconfiguring the aircraft braking system 100, 200.

In another example, with reference to the aircraft system 200 of FIG. 3, in the event of a loss of energy to the third and fourth brake actuators 114c-d from the second hydraulic pump 111b in a first configuration, the controller 400 may determine whether a greater gain in performance can be achieved by opening the crossover valve 130 so that energy is supplied to the third and/or fourth brake actuators 114c-d from the first hydraulic pump 111a, or by coupling the third and/or fourth brake actuators 114c-d to the second hydraulic accumulator 155b. In one example, the controller 400 may determine that a reactive force associated with each of the first to fourth braking actuators 114a-d is lower than a braking force achievable by the respective first to fourth braking actuators 114a-d when they are each powered by the first energy supply 110a, such as when the crossover valve is open 130. Then even if, on the face of it, the third and fourth brake actuators 114c-d would be able to provide a greater braking force if coupled to the second hydraulic accumulator 155b, rather than the first energy supply 110a, it would not be possible to utilise this greater additional braking force as the reactive force is so low that the wheels would slip. Thus, the controller 400 may cause the crossover valve to open 130, particularly if this is associated in a lower reconfiguration parameter than recoupling the third and fourth brake actuators 114c-d to the second hydraulic accumulator 155b.

It will be understood that the above examples can be applied generally to the aircraft systems 100, 200 shown in FIGS. 2 and 3, and/or any other possible aircraft braking system. For example, the first brake actuator 114a may be any one or more of the first to fourth brake actuators 114a-d and the second brake actuator 114b may be any other one or more of the first to fourth brake actuators 114a-d. The first configuration and possible alternative configurations will be understood to be any suitable configurations of the aircraft system 100, 200.

Again more generally, and by way of further example, taking one of the first to fourth brake actuators 114a-d as brake actuator "N", and another of the first to fourth brake actuators as brake actuator "N+1", it is possible to define first and second reactive parameters $R_N$ and $R_{N+1}$ representative of a reactive force able to be achieved between the wheels associated with the N and N+1 brake actuators, respectively, and the ground. We here assume that there is a loss of energy to brake N from a primary energy supply, such as the first energy supply 111a in the illustrated examples, in a first configuration. We further assume that, in a first alternative configuration, brake N is isolated from any energy supply and the energy originally supplied to brake N is redistributed to brake N+1. Finally, we assume that in a second alternative configuration, brake N is coupled to a secondary energy supply, such as the second energy supply 111b in the illustrated examples, or to a tertiary energy supply, such as one of the hydraulic accumulators 155a, 155b of the aircraft braking system illustrated in FIG. 3. In the first configuration and each of the first and second alternative configurations, the brake N+1 is coupled to any suitable energy supply.

It is then possible to define braking parameters $B_{(N+1),1}$ and $B_{(N+1),2}$ associated with brake N+1 in the first and second alternative configurations, respectively, and a braking parameter $B_{N,2}$ associated with brake N in the second alternative configuration. The controller 300, 400 may then employ the following pseudo-algorithm:

IF($MIN(R_{N+1}, B_{(N+1),1}) - B_{(N+1),2}) > MIN(R_N, B_{N,2})$,
    Reconfigure the aircraft braking system to the first alternative configuration and redistribute power to brake N+1,
ELSE,
    Reconfigure the aircraft braking system to the second alternative configuration.

In other words, the controller 300, 400 determines the smallest of the reactive force achievable by brake N+1 and the braking force achievable from brake N+1 when redirecting brake N's power to brake N+1. That is, if the braking force of brake N+1 represented by the braking parameter $B_{(N+1),1}$ were to be less than the reactive force of brake N+1 represented by the parameter $R_{N+1}$, then the braking force could be ignored. The smaller of these values would then be subtracted from the braking force achievable from brake N+1 without redistributing power to it from brake N. This would result in an indication of the "excess braking force" achievable by the brake N+1. If the reactive force represented by $R_{N+1}$ were to be lower than the braking force represented by $B_{(N+1),2}$ (e.g. in wet conditions), then the excess braking force would be negative, indicating that a wheel associated with brake N+1 would slip if the brake N+1 were to be operated at full capacity, even without receiving extra power from brake N. In which case, the left hand side of the IF statement would be less than the right side and the controller 300, 400 would cause reconfiguration of the aircraft braking system 100, 200 to the second alternative configuration, and would not redistribute any energy to the brake N+1.

If, instead, the braking force of brake N+1 represented by the braking parameter $B_{(N+1),1}$ were to be greater than the reactive force of brake N+1 represented by the parameter $R_{N+1}$, then it would be possible for brake N+1 to provide an excess braking force without causing wheel slip of an associated wheel. That is, the excess braking force determined by the difference between $B_{(N+1),1}$ and $B_{(N+1),2}$ would be positive. If the excess braking force itself were to be larger than the smaller of the reactive force of the brake N, represented by $R_N$, or the braking force achievable from brake N in the second alternative configuration, represented by $B_{N,2}$, then the controller 300, 400, would cause a reconfiguration to the first alternative configuration and an associated redistribution of power to wheel N+1. That is, the controller 300, 400 would determine that a higher total braking force can be achieved by redistributing power to the brake N+1 than could be achieved by coupling brake N to, e.g., a secondary or tertiary energy supply.

It will be understood that the above example can be extended to any number of brake actuators N. For example, each brake actuator N may be a set of brake actuators N. The pseudo-algorithm could be performed to compare the braking performance of any number of other alternative configurations. This or these comparisons could then be used to determine the change in performance achievable by reconfiguring from the first configuration to the respective other one or more alternative configurations.

In some examples, the reactive parameter is determined by the controller 300, 400 on the basis of a measured performance of the brake actuators 114a-d under consideration. For example, the controller 300, 400 may determine the reactive parameter on the basis of a signal received by the controller 300, 400 from an ABS system of the aircraft 100, such as a signal representative of a measured slip associated with the brake actuators 114a-d under consideration. In some examples, the controller 300, 400 is configured to determine the reactive parameter on the basis of a signal from one or more sensors configured to measure the performance of one or more of the brake actuators 114a-d under consideration, such as a torque sensor, a force sensor, a pressure sensor, a voltage sensor, and/or wheel speed sensor.

In some examples, the controller 300, 400 is configured to determine the reactive parameter on the basis of an environmental condition, such as a condition of an atmosphere surrounding the aircraft 10 and/or a ground condition. In some examples, the atmospheric condition is a weather condition, such as determined on the basis of one or more signals received from a weather monitoring device, such as a weather monitoring device on-board the aircraft 10 or located externally to the aircraft, such as at an air-traffic control tower. In some examples, the atmospheric condition comprises a windspeed, a wind direction, a temperature, and/or an amount of rain. The ground condition is representative of a friction of the ground, such as a surface roughness, a wetness, and/or or a presence of ice on the ground. The ground condition may be determined on the basis of a signal received from a remote source, such as an air traffic control tower or another aircraft, and/or from a local source, such as sensors, on board the aircraft 10.

In some examples, the controller 300, 400 is configured to determine the reactive parameter on the basis of a status of the aircraft 10. In some examples, the status of the aircraft 10 includes an aircraft position, which may be determined based on signals received by the controller 300 from a GPS on board the aircraft 10 or located in an air traffic control tower. In some examples, the status of the aircraft 10 includes an aircraft motion, such as a direction of motion, a speed, or a trim of the aircraft 10, for example as determined by sensors onboard the aircraft 10. In some examples, the status of the aircraft 10 includes an aircraft orientation, such as a level of roll, pitch or yaw of the aircraft 10 for example as determined by sensors on board the aircraft 10. In some examples, the status of the aircraft 10 includes a configuration of the aircraft, such as a configuration of flaps, air brakes, reverse thrusters, ailerons, and/or a rudder of the aircraft 10. The status of the aircraft is a current status of the aircraft, but in some examples it can be an anticipated status of the aircraft, such as an anticipated status once the aircraft braking system 100, 200 is braked in a given configuration of the aircraft braking system 100, 200, such as an alternative configuration.

Figure 4:
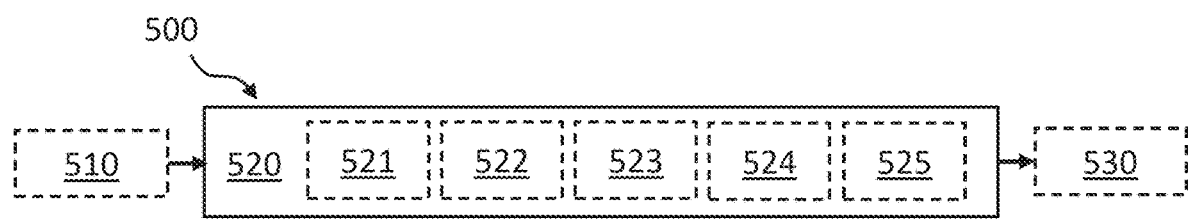
FIG. 4 shows a schematic diagram of a method of operating a controller for an aircraft system according to an example of the present invention.

FIG. 4 shows an example method 500 of operating a controller of an aircraft system of the aircraft 10. In the following example, we describe the method 500 in relation to operating the controller 300 of the aircraft system 100 shown in FIG. 2, though the method 500 equally applies to the controller 400 of the aircraft braking system 200 of FIG. 3. As described above, the aircraft braking system 100 is configurable in a first configuration, in which the first brake actuator 114a is coupled to the first energy supply 110a, and an alternative configuration in which the first actuator 114a is uncoupled from the first energy supply 110a. The method 500 comprises, when the aircraft braking system 100 is configured in the first configuration, determining 510 that there is a loss of energy supplied to the first brake actuator 114a from the first energy supply 110a. The method 500 further comprises determining 520 a change in performance achievable by reconfiguring the aircraft braking system 100 from the first configuration to the alternative configuration and, in the event that the change in performance is a gain in performance, causing 530 reconfiguration of the aircraft braking system 100 from the first configuration to the alternative configuration. Accordingly, the method comprises determining the change in performance on the basis of a comparison between a current performance achievable when the aircraft system is configured in the first configuration and a predicted performance achievable by reconfiguring the aircraft system from the first configuration to the alternative configuration. In some examples, the method comprises: determining the current performance and the predicted performance, performing a comparison between the current performance and the predicted performance, and determining the change in performance on the basis of the comparison between the current performance and the predicted performance.

More specifically, the determining 520 the change in performance optionally comprises determining 520 a respective change in performance achievable by reconfiguring the aircraft braking system 100 from the first configuration to each of a plurality of alternative configurations, as described above. The method 500 optionally comprises, in the event that at least one of the changes in performance is a gain in performance, selecting 525 the alternative configuration to which reconfiguring the aircraft system 100 would result in a gain in performance. The causing 530 reconfiguration of the aircraft braking system 100 then comprises causing 530 reconfiguration of the aircraft braking system 100 from the first configuration to the selected alternative configuration.

In some examples, the determining 520 the change in performance is on the basis of a change in performance associated with two or more of the braking actuators 114a-d. The determining 520 the change in performance optionally comprises determining 521, for each brake actuator 114a-d under consideration, the first and second reactive parameters described above. The determining 520 the change in performance optionally comprises determining 522, for each brake actuator 114a-d under consideration, the first and second braking parameters described above. The determining 520 optionally comprises determining 520 the change in performance on the basis of the determined reactive parameter(s) and braking parameter(s). In some examples, the determining 522 the first and second reactive parameters the change in performance is on the basis of one or a combination of a measured performance of each brake actuator 114a-d under consideration, an environmental condition, and a status of the aircraft, as described above.

In some examples, the determining 520 the change in performance optionally comprises determining 523 a reconfiguration parameter representative of a loss in performance estimated to be incurred by an action of reconfiguring the aircraft braking system 100 from the first configuration to the alternative configuration, and determining 520 the change in performance on the basis of the reconfiguration parameter. In some examples, the determining 520 the change in performance optionally comprises determining 524 a symmetry parameter representative of a change in a symmetry of braking around a plane of symmetry of the aircraft 10, such as around the fuselage 15, and/or around a given landing gear 11a-b, and determining 520 the change in performance on the basis of the determined symmetry parameter.

Figure 5:
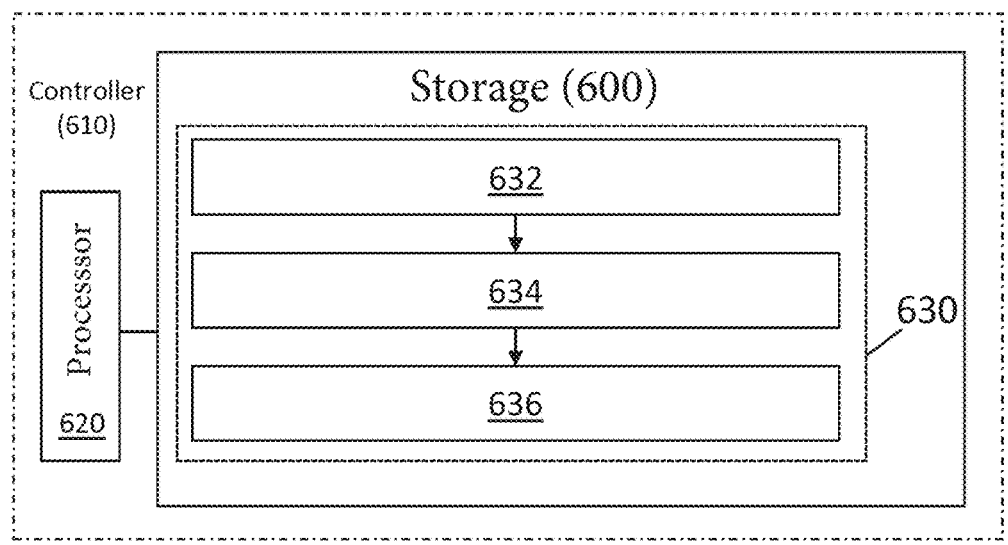
FIG. 5 shows a schematic diagram of a non-transitory computer-readable storage medium according to an example of the present invention.

FIG. 5 shows a schematic diagram of a non-transitory computer-readable storage medium 600 according to an example. The non-transitory computer-readable storage medium 600 stores instructions 630 that, if executed by a processor 620 of a controller 610, cause the processor 620 to perform a method according to an example. In some examples, the controller 610 is the controller 300, 400 as described above with reference to FIG. 2 or FIG. 3 or any variation thereof discussed herein. The instructions 630 comprise: determining 632 that there is a loss of energy supplied to the a first brake actuator 114a from a first energy supply 110a in a first configuration of an aircraft braking system; determining 634 a change in performance achievable by reconfiguring the aircraft braking system 100, 200 from the first configuration to an alternative configuration in which the first brake actuator 114a is uncoupled from the first energy supply 110a; and, in the event that the change in performance is a gain in performance, causing 636 reconfiguration of the aircraft braking system 100, 200 from the first configuration to the alternative configuration. In other examples, the instructions 330 comprise instructions to perform any other example method described herein, such as the method 200 described above with reference to FIG. 4.

While the above examples are described in relation to a hydraulic aircraft braking system 100, 200, it will be understood that, in some examples, the aircraft braking system 100, 200 is an electric aircraft braking system 100, 200. In such examples, the first and second energy supplies 110a-b are first and second electrical energy supplies 110a-b, such as respective first and second generators or batteries. In some examples, the first energy supply 110a may be a generator and the second energy supply 110b may be a battery, or vice-versa. Moreover, in such examples, the various components of the electric aircraft braking system 100, 200 are electric components that perform electrical functions analogous to the hydraulic functions of corresponding hydraulic components of the hydraulic aircraft braking system 100, 200. Specifically, in some examples, the crossover valve 130 shown in FIG. 3 is instead an electrical switch, or other suitable electrical component, and the first and second hydraulic accumulators 155a-b are respective first and second batteries. The various connections between components of such an electric aircraft braking system 100, 200 are electrical connections, such as wires.

It will be further understood that, while the above examples are described in relation to an aircraft system which is an aircraft braking system 100, 200, in some examples, the aircraft system is other than an aircraft braking system 100, 200. In some examples, the aircraft system is the same as the aircraft braking system 100, 200 described above, except that instead of being coupled to the sets of brakes 14a, 14b of the aircraft 10, the first and second energy supplies 110a-b of the aircraft system are coupled to other actuatable components of the aircraft. In some examples, the aircraft 10 comprises first and second spoilers, and the first and second energy supplies 110a-b are coupled to actuators configured to actuate the first and second spoilers, respectively. It will be understood that in some examples the first and second spoilers are any other actuatable aircraft component, such as flaps, ailerons, reverse thrusters and/or landing gear doors.

It is also to be noted that the term "or" as used herein is to be interpreted to mean "and/or", unless expressly stated otherwise.

The invention claimed is:

1. A controller for an aircraft system of an aircraft, the aircraft system comprising an actuation system and a first energy supply which provides power to the actuation system, wherein the actuation system includes a first actuator and the controller is configured to:

when the aircraft system is configured in a first configuration in which the first actuator is coupled to the first energy supply, determine that there is a loss of energy supplied to the first actuator from the first energy supply;

determine a current performance of the actuation system achievable when the aircraft system is configured in the first configuration, wherein the determination of the current performance is in response to the determination of the loss of the energy supplied to the first actuator;

determine, while the aircraft system is in the first configuration, a predicted performance of the actuation system achievable by the aircraft system if configured in an alternative configuration in which the first actuator is uncoupled from the first energy supply;

compare, while the aircraft system is in the first configuration, the current performance to the predicted performance;

determine, based on the comparison of the current performance to the predicted performance, a change in performance of the actuation system achievable by reconfiguring the aircraft system from the first configuration to the alternative configuration, and cause reconfiguration of the aircraft system from the first configuration to the alternative configuration, when the change in performance determined by the controller is a gain in performance.

2. The controller of claim 1, wherein the aircraft system comprises a second energy supply, and wherein the alternative configuration is either:

a first alternative configuration, in which the first actuator is coupled to the second energy supply; or a second alternative configuration, in which the first actuator is isolated from the first energy supply and the second energy supply.

3. The controller of claim 2, wherein the actuation system further comprises a second actuator different from the first actuator, wherein in the first configuration, the second actuator is coupled to the first energy supply, wherein in the first alternative configuration, the second actuator is coupled to the first energy supply, and wherein in the second alternative configuration, the second actuator is coupled to the second energy supply.

4. The controller of claim 3, configured to determine the change in performance of the actuation system based on a change in performance associated with the first and second actuators achievable by reconfiguring the aircraft system from the first configuration to the first alternative configuration or the second alternative configuration.

5. The controller of claim 2, wherein the actuation system further comprises a second actuator different from the first actuator, wherein, in the first configuration, the second actuator is coupled to the second energy supply, wherein in the first alternative configuration, the second actuator is coupled to the first energy supply, and wherein, in the second alternative configuration, the second actuator is coupled to the second energy supply.

6. The controller of claim 5, configured to determine the change in performance of the actuation system based on a change in performance associated with the first and second actuators achievable by reconfiguring the aircraft system from the first configuration to the first alternative configuration or the second alternative configuration.

7. The controller of claim 2, wherein the aircraft system comprises a third energy supply, and wherein the first actuator is coupled to the third energy supply in the second alternative configuration.

8. The controller of claim 1, wherein the actuation system is a brake actuation system and the first actuator is a first brake actuator configured to brake a first wheel of the aircraft, and wherein the controller is configured to:

determine a first parameter representative of a maximum reactive force able to be achieved between the first wheel and the ground; and determine the predicted performance of the brake actuation system based on the first parameter.

9. The controller of claim 8, wherein the brake actuation system further comprises a second actuator, wherein the second actuator is a second brake actuator configured to brake a second wheel of the aircraft, and wherein the controller is configured to:

determine a second parameter representative of a maximum reactive force able to be achieved between the second wheel and the ground;

determine a second braking parameter representative of a maximum braking force able to be applied by the second brake actuator in the alternative configuration; and determine the predicted performance of the brake actuation system based on the first and second parameters and the first and second braking parameters.

10. The controller of claim 9, configured to determine the first and second parameters based on one or a combination of: a measured performance of the respective first and second brake actuators; an environmental condition; and a status of the aircraft.

11. The controller of claim 10, wherein the measured performance of each of the first and second brake actuators comprises one or more of: a measured slip between the respective first and second wheel and the ground; a measured energy supplied to the respective first and second brake actuator; and a measured braking torque, or braking force, applied by the respective first and second brake actuator to the respective first and second wheel.

12. The controller of claim 1, wherein the actuation system is a brake actuation system and the first actuator is a first brake actuator configured to brake a first wheel of the aircraft, and wherein the controller is configured to:

determine a first braking parameter representative of a maximum braking force able to be applied by the first brake actuator in the alternative configuration; and determine the predicted performance of the brake actuation system based on the first braking parameter.

13. The controller of claim 1, configured to:

determine a reconfiguration parameter representative of a loss in performance of the actuation system estimated to be incurred by an action of reconfiguring the aircraft system from the first configuration to the alternative configuration; and determine the predicted performance of the actuation system based on the reconfiguration parameter.

14. The controller of claim 1, wherein the predicted performance of the actuation system is included in a plurality of predicted performances of the actuation system and the alternative configuration is included in a plurality of alternative configurations, and the controller is further configured to:

determine a respective one of the predicted performances for each of the plurality of alternative configurations;

if at least one of the predicted performances is a gain in performance over the current performance, select one of the alternative configurations which would result in a gain in performance; and cause reconfiguration of the aircraft system from the first configuration to the alternative configuration selected by the controller.

15. A method of operating a controller of an aircraft system of an aircraft, the aircraft system comprising an actuation system and a first energy supply which supplies power to the actuation system, wherein the actuation system includes a first actuator and the method comprises:

when the aircraft system is configured in a first configuration in which the first actuator is coupled to the first energy supply, determining that there is a loss of energy supplied to the first actuator from the first energy supply;

determining a current performance of the actuation system achievable if the aircraft system is configured in the first configuration, wherein the determination of the current performance is after the determination of the loss of the energy supplied to the first actuator;

determining, a predicted performance of the actuation system achievable by the aircraft system if configured in an alternative configuration in which the first actuator is uncoupled from the first energy supply, wherein the determination of the predicted performance is determined while the aircraft system is in the first configuration;

comparing the current performance to the predicted performance, wherein the comparison is performed while the aircraft system is in the first configuration;

determining, based on the comparison of the current performance to the predicted performance, a change in performance of the actuation system achievable by reconfiguring the aircraft system from the first configuration to the alternative configuration, and causing reconfiguration of the aircraft system from the first configuration to the alternative configuration when the change in performance of the actuation system is a gain in performance over the current performance.

16. The method of claim 15, wherein the actuation system is a brake actuation system, the first actuator is a first brake actuator and the brake actuation system comprises a second brake actuator, and the brake actuation system is configured to brake respective first and second wheels of the aircraft, and wherein the method comprises:

determining a first parameter and a second parameter representative of a maximum reactive force able to be achieved between the respective first and second wheels and the ground;

determining a first braking parameter and a second braking parameter representative of a maximum braking force able to be applied by the respective first and second brake actuators in the alternative configuration; and determining the change in performance based on the first parameter, the second parameter, the first braking parameter, and the second braking parameter.

17. A non-transitory computer-readable storage medium storing instructions that, when executed by a processor of a controller of an aircraft braking system, cause the processor to perform the method of claim 15.

18. A controller for an aircraft braking system of an aircraft, the aircraft braking system comprising a brake actuation system including a brake actuator and an energy supply system including a first energy supply which supplies power to the brake actuation system, the controller configured to:

when the aircraft braking system is configured in a first configuration, in which the brake actuator is coupled to the first energy supply, determine that there is a loss of energy supplied to the brake actuator from the first energy supply;

after the determining of the loss of energy, determining a current performance of the brake actuation system achievable if the aircraft system remains in the first configuration;

determine predicted performances achievable by the brake actuation system if configured in each of a plurality of alternative configurations, wherein the determination of the predicted performances is after the determination of the loss of the energy supplied to the brake actuator and while the aircraft braking system is in the first configuration;

comparing the current performance to each of the predicted performances, wherein the comparing the current performance to each of the predicted performances occurs while the aircraft braking system is in the first configuration;

using the comparisons of the current performance to each of the predicted performances to select one of the alternative configurations which would result in a gain in performance from the current performance; and cause reconfiguration of the aircraft braking system from the first configuration to the alternative configuration selected by the controller.

19. An aircraft system comprising the controller of claim 1.

20. An aircraft comprising the controller of claim 1.

* * * * *